(12) United States Patent
Harris

(10) Patent No.: US 9,585,449 B2
(45) Date of Patent: Mar. 7, 2017

(54) MOBILE PHONE ENCLOSURES

(71) Applicant: Seth Berger, Malvern, PA (US)

(72) Inventor: Joshua Harris, Lancaster, PA (US)

( * ) Notice: Subject to any disclaimer, the term of this patent is extended or adjusted under 35 U.S.C. 154(b) by 0 days.

(21) Appl. No.: 14/170,795

(22) Filed: Feb. 3, 2014

(65) Prior Publication Data

US 2014/0217866 A1 Aug. 7, 2014

Related U.S. Application Data

(60) Provisional application No. 61/759,731, filed on Feb. 1, 2013, provisional application No. 61/771,641, filed on Mar. 1, 2013.

(51) Int. Cl.
| | |
|---|---|
| *A45C 11/00* | (2006.01) |
| *A45D 24/00* | (2006.01) |
| *A46B 15/00* | (2006.01) |
| *A45C 15/00* | (2006.01) |
| *H04B 1/3816* | (2015.01) |
| *H04B 1/3888* | (2015.01) |

(52) U.S. Cl.
CPC .............. *A45C 11/00* (2013.01); *A45D 24/00* (2013.01); *A46B 15/0055* (2013.01); *A45C 15/00* (2013.01); *A45C 2011/002* (2013.01); *H04B 1/3816* (2013.01); *H04B 1/3888* (2013.01)

(58) Field of Classification Search
CPC .. A45D 24/10; A45D 40/18; A46C 2011/001; A46C 2011/002; A46C 2011/003; A46B 45/0055; A46B 45/0061; A46B 45/0057; A46B 5/0055; A46B 5/0061; A46B 5/00571

USPC ................... 132/148, 286, 314, 333
See application file for complete search history.

(56) References Cited

U.S. PATENT DOCUMENTS

| | | | | |
|---|---|---|---|---|
| 1,530,070 | A * | 3/1925 | Bovee | 132/314 |
| 4,336,815 | A * | 6/1982 | Ross | 132/143 |
| 4,716,915 | A * | 1/1988 | Burns | 132/286 |
| 5,163,456 | A * | 11/1992 | Lombardi, Jr. | 132/103 |
| 5,520,202 | A * | 5/1996 | Arbree | 132/294 |
| 7,984,804 | B2 * | 7/2011 | Lebauer | 206/320 |
| 8,418,852 | B2 * | 4/2013 | Ziemba | 206/235 |
| 8,499,933 | B2 * | 8/2013 | Ziemba | 206/320 |
| 2005/0155618 | A1* | 7/2005 | Lafferty | 132/104 |
| 2007/0184812 | A1* | 8/2007 | Bitton | 455/344 |
| 2011/0294542 | A1* | 12/2011 | Ray et al. | 455/556.1 |

(Continued)

*Primary Examiner* — Tatiana Nobrega
(74) *Attorney, Agent, or Firm* — Dilworth Paxson LLP; Edward F. Behm, Jr.

(57) ABSTRACT

The present invention includes a mobile phone enclosure which provides a user access to the features of the mobile device within a protective enclosure further providing at least one appearance enhancing device. Such an enclosure may comprise a brush and/or comb and may provide at least one storage area for the appearance enhancing device. Such a protective enclosure may be for an electronic device having interactive controls and may comprise a protective shell substantially surrounding said electronic device when the electronic device is disposed in said shell, the electronic device being insertable in and removable from said shell by hand and having at least one opening in the shell substantially aligned with the interactive controls when the electronic device is disposed in the protective shell, and having at least one appearance enhancement device removably disposed within the bounds of the shell.

9 Claims, 6 Drawing Sheets

(56) References Cited

U.S. PATENT DOCUMENTS

2014/0166505 A1\* 6/2014 Yu et al. .................. 206/37

\* cited by examiner

MOBILE PHONE ENCLOSURES

CROSS-REFERENCE TO RELATED APPLICATIONS

This application claims priority to U.S. Provisional Patent Application Ser. No. 61/759,731, filed Feb. 1, 2013 and to U.S. Provisional Patent Application Ser. No. 61/771,641, filed Mar. 1, 2013, each of which is incorporated herein by reference as if set forth in their entireties.

BACKGROUND

Field of the Invention

The present invention relates to the enclosure of a mobile device, and, more particularly, to a mobile device enclosure having associated therewith at least one device for the manipulation of hair.

Background of the Invention

Mobile phone ownership is a ubiquitous fact of life. By the end of this year, it is estimated that the number of mobile phone in the world with exceed the actual number of inhabitants—meaning there will be roughly 7.3 million mobile devices. Reliance on these devices vary, but the use of multiple offered services, beyond that of simply making a phone call, is almost a universally accepted fact for each user of a mobile device.

To protect the value of these mobile devices, most users will separately purchase a cover to protect the phone from dirt and scratches. Similarly, mobile phone covers may provide some protection to a phone when dropped and may even provide for extra battery storage, for example. However, mobile phone cases do not generally offer non-mobile device related functionality. Although some examples of such functionality include the provision of a pocket to hold items, such as, for example, credit cards, none provide a functionality sufficient to affect the user's appearance.

Thus, there exists a need for a mobile device cover which may provide both protection of the mobile device and functionality related to the appearance of the user.

SUMMARY

The present invention includes a mobile phone enclosure which provides a user access to the features of the mobile device within a protective enclosure further providing at least one appearance enhancing device. Such an enclosure may comprise a brush and/or comb and may provide at least one storage area for the appearance enhancing device.

Thus, the present invention provides a device for protecting a mobile device and for providing an appearance enhancing device, and the relevant accessories typically associated therewith. It is to be understood that both the foregoing general description and the following detailed description are exemplary and explanatory, and are intended to provide further explanation of the invention as discussed hereinthroughout.

BRIEF DESCRIPTION OF THE DRAWINGS

The accompanying drawings are included to provide a further understanding of the disclosed embodiments. In the drawings, like numerals represent like elements, and.

DETAILED DESCRIPTION

The present invention provides users of mobile devices the ability to more easily and safely transport a mobile device while simultaneously providing access to, and convenient transport of, appearance enhancement devices, such as, for example, combs and/or brushes. To provide a mobile phone case that may be easily stored, for example, the present invention may provide at least one storage space within the protective enclosure to prevent that associated appearance enhancement device from entangling and/or otherwise engaging with unwanted aspects of the user's person, such as, for example, the inside of a user's pocket where the mobile device and protective enclosure may be carried.

The bristles of an included brush and/or the teeth of an included comb may be of any shape and/or dimension to best suit the space provided by the enclosure and/or the type of hair the user is supposed to have. For example, a protective enclosure may include a comb and may be targeted to people having thick and/or coarse hair. Such a comb may have fewer, more narrow teeth than a comb designed for a user who may have soft and fine hair, for example. In embodiments of the present invention wherein the appearance enhancement device is not integrally fixed to the mobile device enclosure, the user may select a comb and/or brush included with the mobile device enclosure to best suit the user's hair type.

An appearance enhancement device may further comprise a mirror, for example, and may be placed on the mobile device enclosure and/or may be made at least partially a portion of another appearance enhancement device, such as a comb and/or brush. In this way, a user may be able to view themselves to better control the use of an appearance enhancement device, for example. In an embodiment of the present invention, such a mirror may be at least partially hidden behind another appearance enhancement device such that removal of one appearance enhancement device will expose greater use of another appearance enhancement device.

Although not shown in the accompanying drawings, the protective enclosure of the present invention may only partially cover the front of a mobile device and may substantially provide access to the usable functionality of a mobile device which may include, for example, a touch screen interface and/or a button and/or other user interface known to those skilled in the arts.

Figure 1:
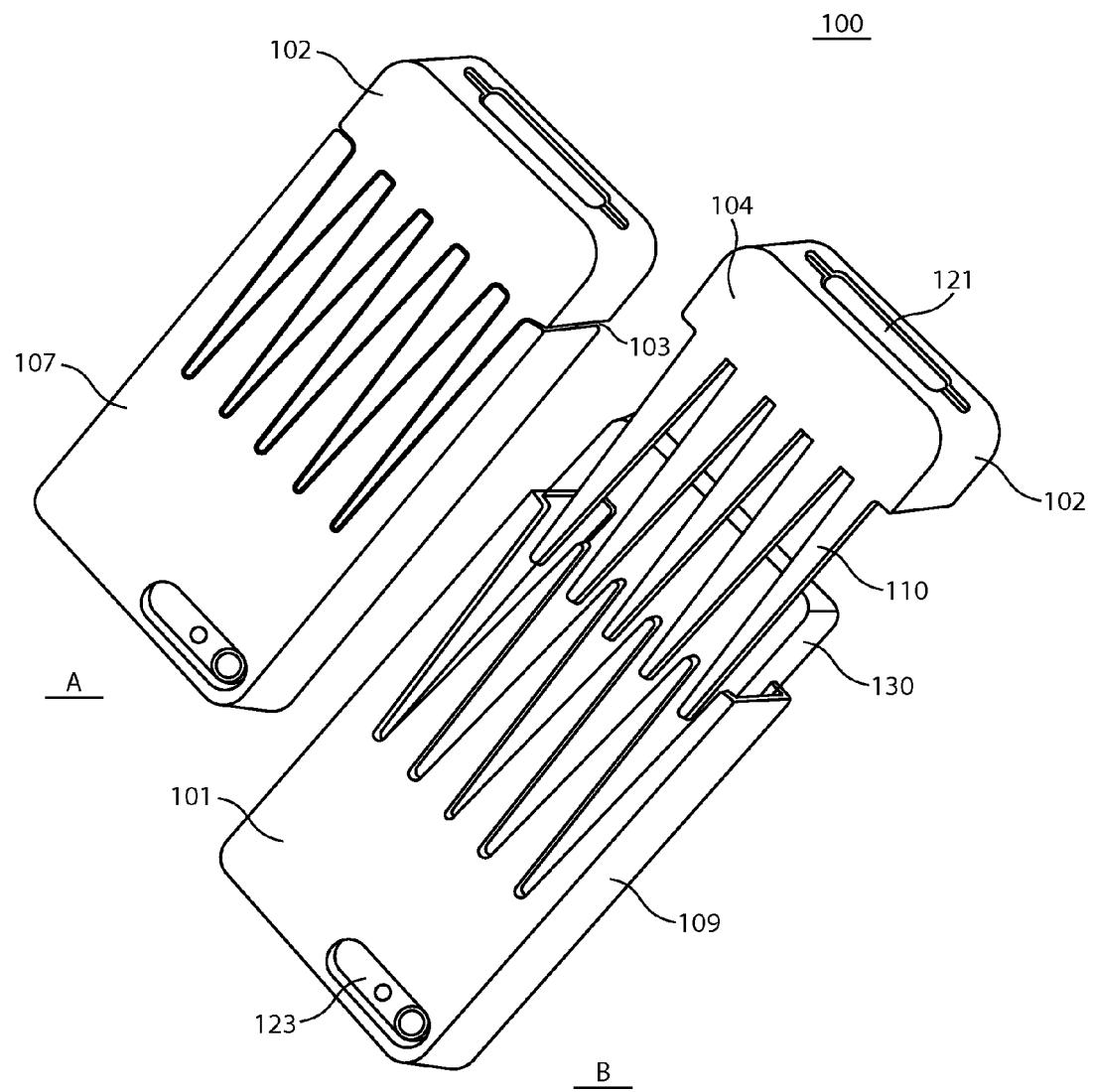
FIG. 1 illustrates an aspect of an exemplary embodiment of the present invention.

An embodiment of the present invention is illustrated in FIG. 1. A protective enclosure 100 may include an upper portion 101 and a lower portion 102 which may intersect along boundary 103. The boundary 103 may be orientated to provide teeth 110 on the back portion 104 of lower portion 102 and on back portion 107 of upper portion 101. The teeth 110 formed by boundary 103 may be of suitable length and separation as to provide a user with a usable hair comb when lower portion 102 is removed from upper portion 101 and is pulled through the hair of the user using a combing action.

In an embodiment of the present invention, teeth 110 may be provided on lower portion 102.

Teeth 110 may be of any length, and may preferably be of a length suitable to allow for effective combing action of a user's hair while remaining within the bounds of protective enclosure 100. In an embodiment of the present invention, teeth 110 may have a height equal to ¼ to ½ the total height of protective enclosure 100. Upper portion 101 may be larger than lower portion 102 and may provide greater coverage of mobile device 130 than does lower portion 102. Upper portion 101 may include openings on back portion 107 suitable for receiving teeth 110 such that when lower portion 102 and upper portion 101 are joined together boundary 103 is substantially sealed as illustrated in position A of FIG. 1.

Upper portion 101 may further include at least one opening, and may comprise a camera opening 123 to allow for a camera of mobile device 130 to be exposed through protective enclosure 100. A proportion 101 may further include u-shaped sides which may substantially conform to the depth of mobile device 130. In this way, mobile device 130 may be slid within upper portion 101 in a secure manner. Similarly, lower portion 102 may include curved and/or u-shaped portions which may allow lower portion 102 to substantially conform to the exterior of mobile device 130 when fully engaged with protective enclosure 100. Lower portion 102 may further comprise at least one opening and may include lower opening 121 which may provide an opening for speakers and/or charging ports, for example, which may be included on mobile device 130.

In an embodiment of the present invention, a user may remove lower portion 102 from upper portion 101, as shown in position B of FIG. 1. After removal of lower portion 102, a user may then utilize teeth 110 to comb, for example, their hair, as needed. As would be appreciated by those skilled in the art, protective enclosure 100 may be formed by rigid materials sufficient to allow for teeth 110 to effectively comb and/or brush a user's hair. Such materials may include, for example, thermoplastics which may allow protective enclosure 100 to be formed through a mold process. Protective enclosure 100 may not have uniform rigidity, and may, for example, provide one level of rigidity per lower portion 102 and teeth 110 while providing for a second rigidity in upper portion 101. By way of example, upper portion 101 may be substantially composed of a less rigid material which may provide for cushioning of the mobile device 130 while lower portion 102 may be of a more rigid material which may be sufficient to provide substantial rigidity in teeth 110 but which may provide for less cushioning of mobile device 130 than is provided for by upper portion 101.

Figure 2:
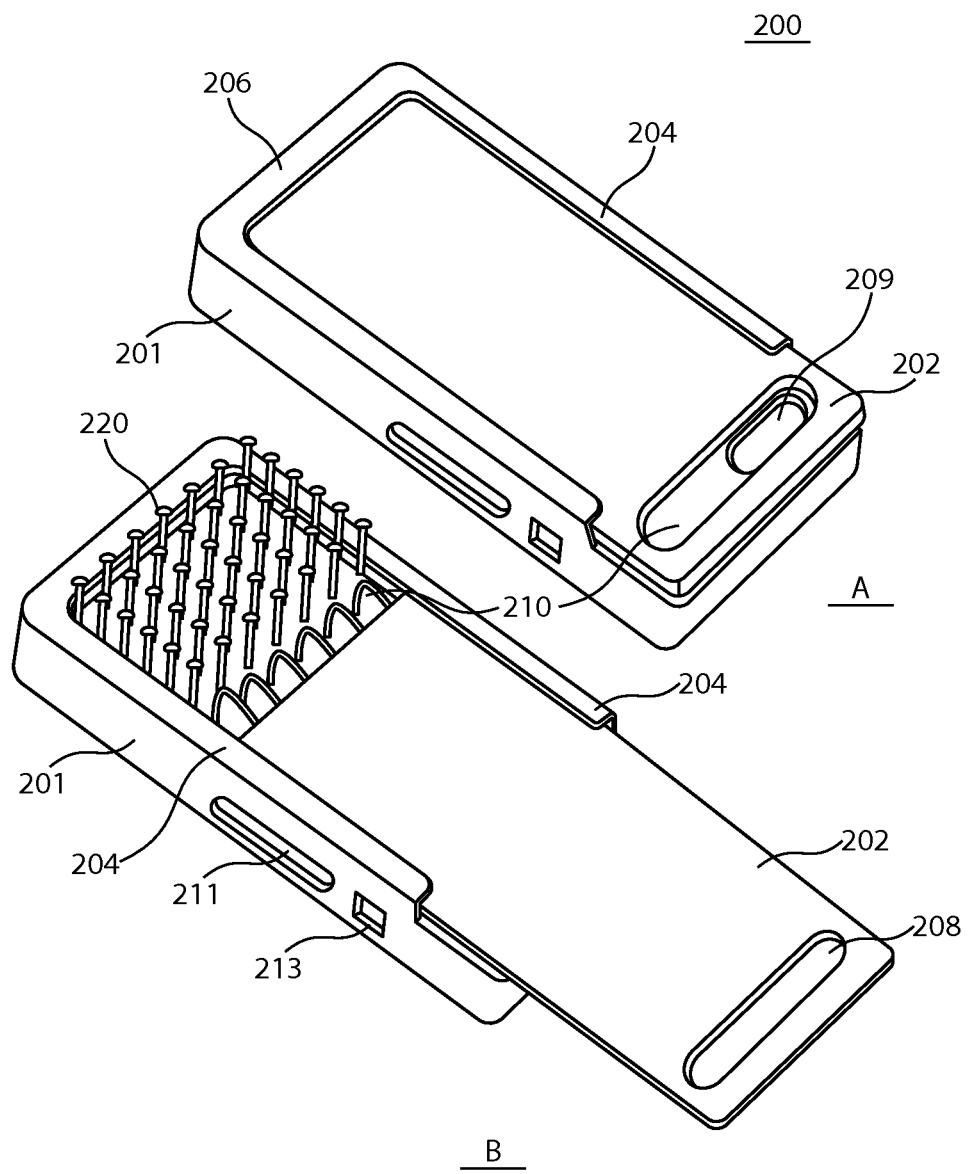
FIG. 2 illustrates an aspect of an exemplary embodiment of the present invention.

In an embodiment of the present invention as illustrated in FIG. 2 a brush may be provided as part of a protective case for a mobile device. Protective enclosure 200 may encompass a mobile device (not shown) and may include at least 2 pieces such as back portion 202 and front portion 201. Back portion 202 may be sized to slideably fit within front portion 201 and may include at least one opening 208 which may be near the top of back portion 202 and which may correspond to the camera portion of the mobile device (not shown).

Front portion 201 may substantially surround a mobile device and may substantially cover the back and sides of the mobile device. Front portion 201 may include an inner portion 210 which may provide for engagement of the back of a mobile device and which may provide for the securing of bristles 220 on an opposite side. Inner portion 210 may be integrally fixed to front portion 201 and may further include at least one opening 209 which may expose the camera portion of a mobile device. Inner portion 210 may also have attached thereto brush bristles 220 which may be orientated in an array, for example, allowing for a plurality of brush bristles 220 to be attached to some portion of inner portion 210.

Brush bristles 220 may be semi-rigid and may be made of a plastic material. As would be appreciated by those skilled in the art, the rigidness of brush bristles 220 may be selected so as to provide resistance when being used to brush a user's hair but flexible enough substantially lay flat against inner portion 210 when covered by back portion 202. As shown in portion B of FIG. 2, the brush bristles 220 may exist in at least a first position in the space provided between back portion 202 and inner portion 210 when back portion 202 is engaged with front portion 201. When top back portion 202 is fully engaged with front portion 201 as shown in position A in FIG. 2, the brush bristles 220 are contained in the space provided between back portion 202 and inner portion 210. When a user removes or substantially removes back portion 202 from front portion 201 as illustrated in position B of FIG. 2, the brush bristles 220 may be released from a tension position to stand semi rigidly perpendicular or substantially perpendicular to inner portion 210.

Brush bristles 220 may be of a height to provide for at least a portion of the brush bristles 220 having a height above front portion 201 to substantially engage the hair of a user when front portion 201 is used as a hair brush. Front portion 201 may additionally have a mobile control opening 211 and/or a second controls opening 213. Such openings may be optional and/or may exist on different portions of front portion 201, for example, to accommodate the particular mobile device which may be substantially surrounded by front portion 201.

Figure 3:
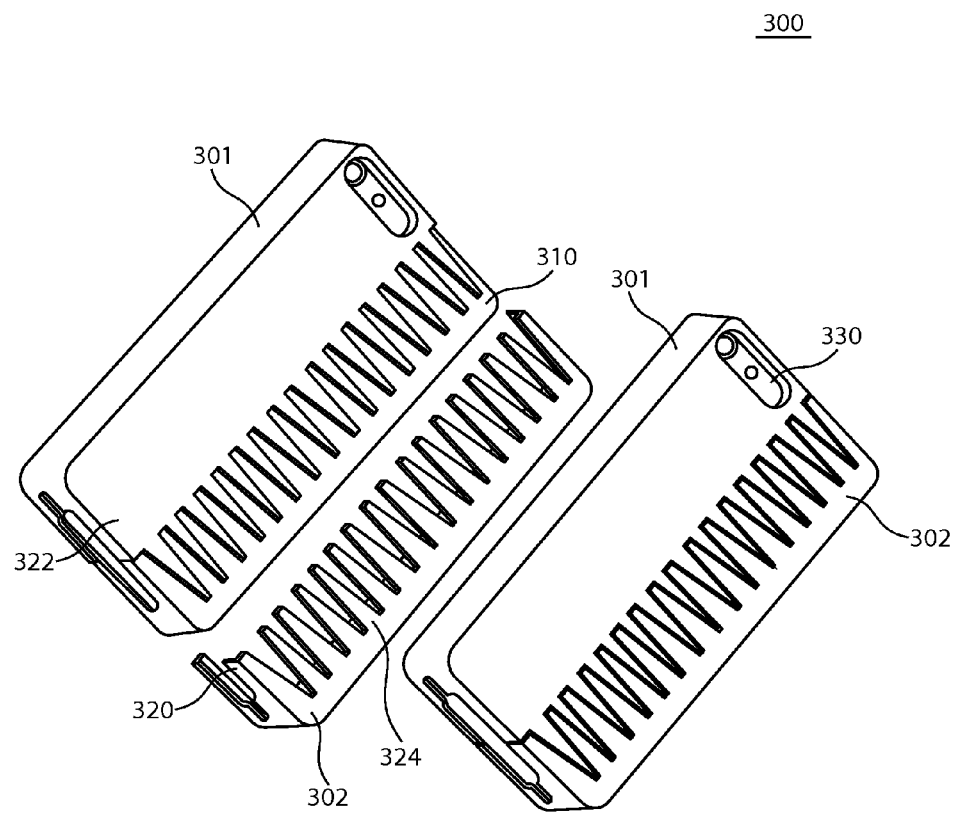
FIG. 3 illustrates an aspect of an exemplary embodiment of the present invention.

In an embodiment of the present invention, as illustrated in FIG. 3, the orientation of the teeth described above, and more particularly with regard to FIG. 1, may be generally across the width of the protective case versus lengthways. As would be appreciated by those skilled in the art, the orientation of the teeth in such an embodiment may follow any direction and may, for example, be diagonal when the protective case is held at a right angle. A protective enclosure 300 may include a side portion 301 and a side portion 302 which may intersect along boundary 310. The boundary 310 may be orientated to provide teeth 324 on the side portion 302 and on side portion 301. The teeth 324 formed by boundary 310 may be of suitable length and separation as to provide a user with a usable hair comb when side portion 302 is removed from side portion 301 and is pulled through the hair of the user using a combing action. In an embodiment of the present invention, teeth 324 may be provided on side portion 302.

Teeth 324 may be of any length, and may preferably be of a length suitable to allow for effective combing action of a user's hair while remaining within the bounds of protective enclosure 300. In an embodiment of the present invention, teeth 324 may have a height equal to ¼ to ¾ the total width of protective enclosure 300. Side portion 301 may be larger than side portion 302 and may provide greater coverage of the enclosed mobile device (not shown) than does side portion 302. Side portion 301 may further include at least one opening, and may comprise a camera opening 330 to allow for a camera of a mobile device to be exposed through protective enclosure 300.

In an embodiment of the present invention, protective enclosure 400 may substantially enclose a mobile device (not shown) on all sides and substantially cover the back of the mobile device and may provide for the attachment of at least one hair grooming device. Protective enclosure 400 may include a mirror portion 450 which may be attached to back portion 414 of protective enclosure 400. The sidewalls 411 of protective enclosure 400 may protrude above back portion 414 and may include along at least a portion of sidewall 411 a side engagement portion 410 and a lower engagement portion 412 which may be parallel or substantially parallel to back portion 414. Side engagement portion 410 and lower engagement portion 412 may be of the width suitable to at least partially engage comb 420 as illustrated in position A of FIG. 4. Back portion 414 may also include at least one opening such as, for example, camera opening 430 which may allow operability of the substantially enclosed mobile device.

Comb 420 may include a polarity of teeth 424 which may act in concert as a means of grooming the hair of the user. Comb 420 may further comprise at least one handle portion 422 which may include, for example, a grip portion which may include detente and or, for example, a rubberized plastic to increase the grip of the user of comb 420. Comb 420 may be of any size and may be sized to suitably fit within the boundary created by protective enclosure 400. More particularly, the comb 420 may sizably fit between side engagements 410 and may be short enough so as not to extend beyond the top of protective enclosure 400 when engaged or at least partially engaged with lower engagement 412.

Figure 4:
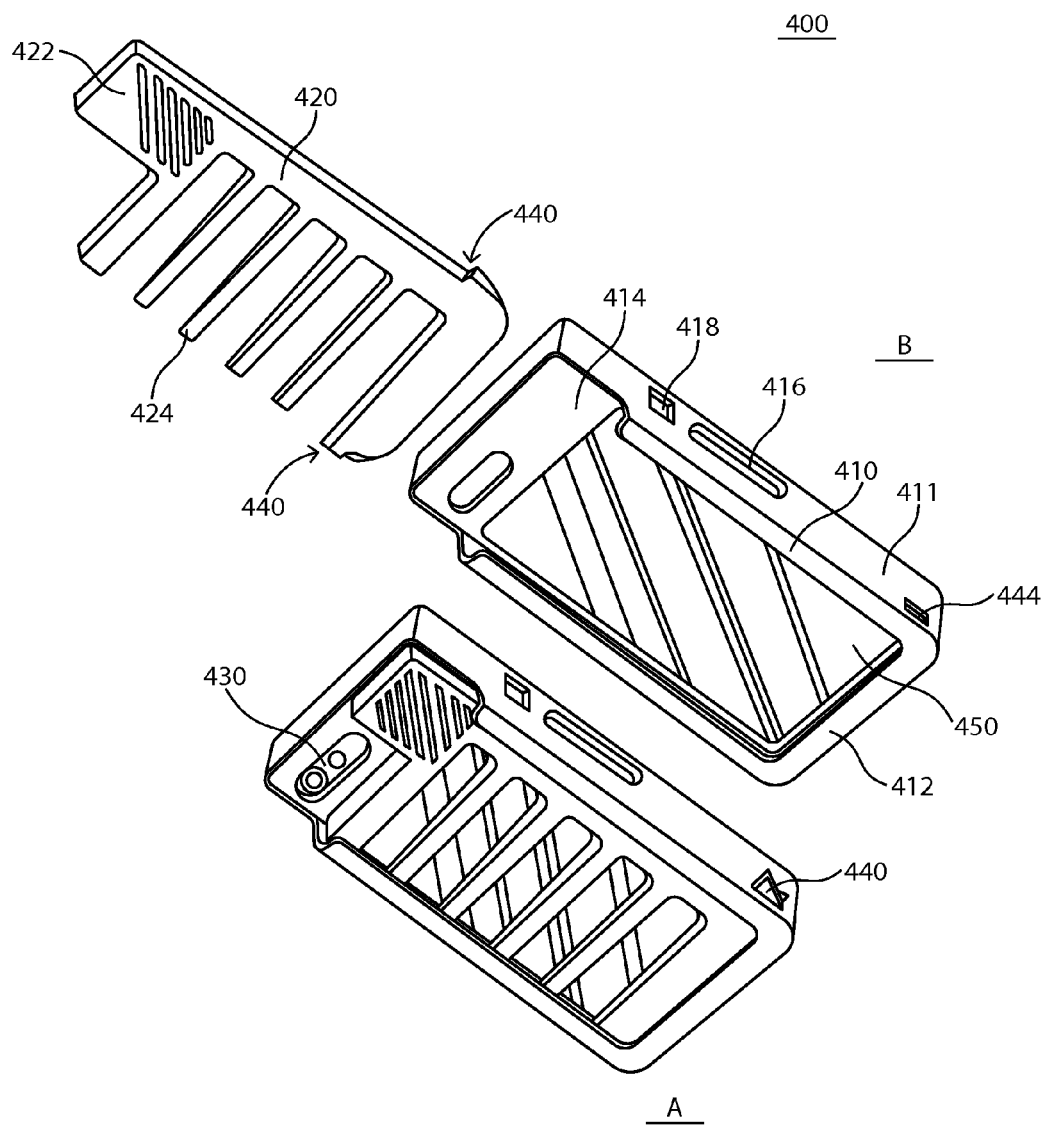
FIG. 4 illustrates an aspect of an exemplary embodiment of the present invention.

As illustrated in position A of FIG. 4, comb 420 may be secured by means known to those skilled in the art and may be secured using clips 420 which may engage a clip receiving portion 444 located on a lower portion of sidewall 411 suitably positioned to engage clip 440 when comb 420 is substantially engaged between side engagements 410 and lower engagement 412. The clip 440 may be of unitary design or mold press of Comb 420 and/or preferably be deformable such that a user may press the portion of clip 440 which may protrude through clip receiving portion 444 such that comb 420 may be slidably released from protective enclosure 400.

The sidewalls of protective enclosure 400 may further include at least a first control opening 416 and/or a second control opening 418 to allow a user access to controls which may exist on the mobile device enclosed by protective enclosure 400. Although not shown, the lower sidewall of protective enclosure 400 may include an additional opening to allow for speakers and/or electronic connections through protective enclosure 400 to a mobile device.

Figure 5:
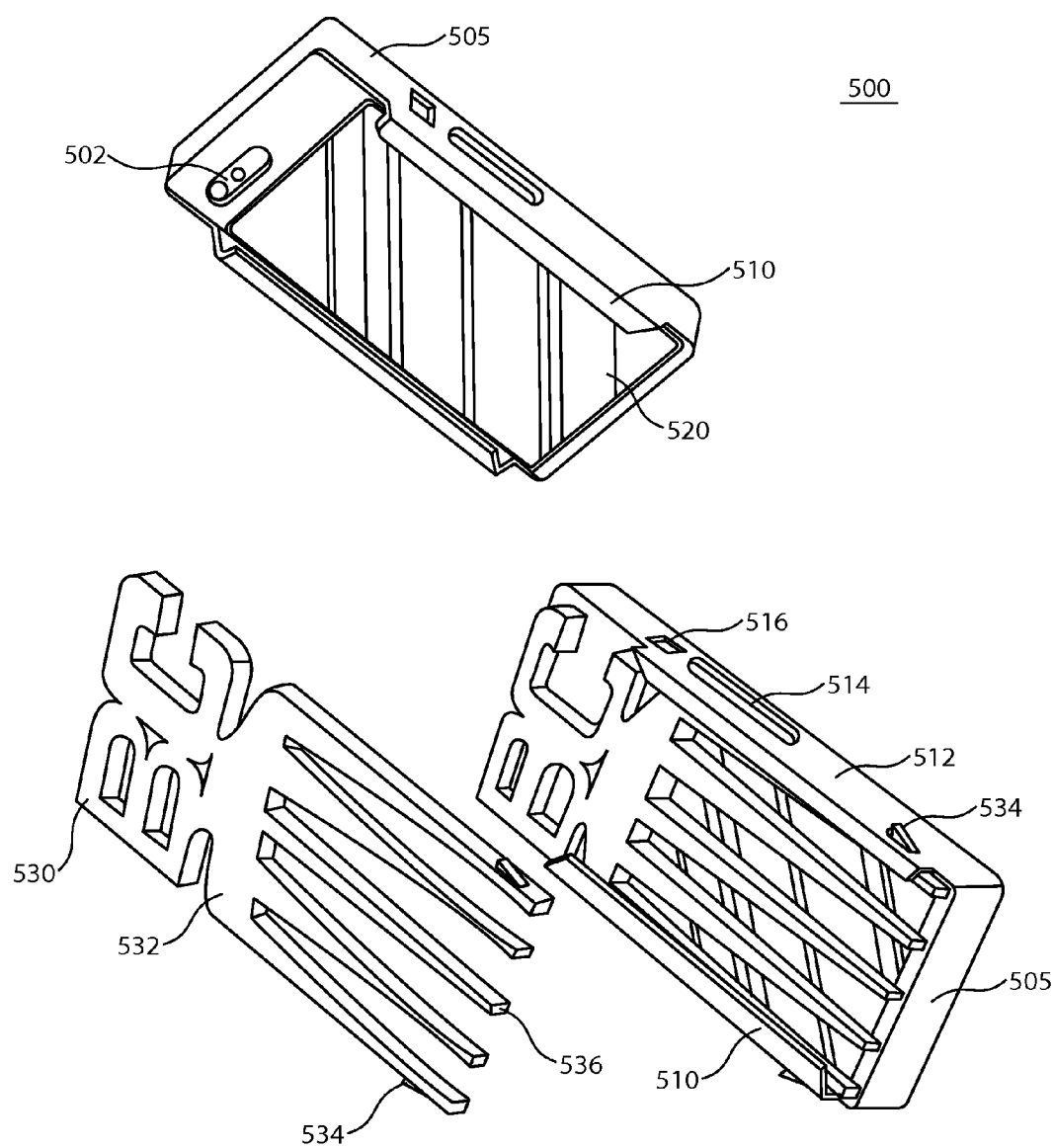
FIG. 5 illustrates an aspect of an exemplary embodiment of the present invention.

Similar to the embodiment described above for FIG. 4, an embodiment of the present invention as illustrated in FIG. 5 may include what may be known to those skilled in the art as a "pick" and/or comb. Protective enclosure 500 may include a mirror portion 520. The sidewalls 512 of protective enclosure 500 may protrude above mirror portion 520 and may include along at least a portion of sidewall 512 a side engagement portion 510 which may be parallel or substantially parallel to the lengthways axis of protective enclosure 500.

Comb 532 may include a polarity of teeth 536 which may act in concert as a means of grooming the hair of the user. Comb 532 may further comprise at least one handle portion 530 which may include, for example, a grip portion which may include detente and or, for example, a rubberized plastic to increase the grip of the user of comb 532. Further, handle portion 530 may be of a specific shape, such as at least one letter and/or geometric shape. For example, handle portion 532 may be shaped to illustrate two letters which may correspond to a brand and/or a users' initials. Comb 532 may be of any size and may be sized to suitably fit within the boundary created by protective enclosure 500. More particularly, the comb 532 may sizably fit between side engagements 510 and may be short enough so as not to extend beyond the top of protective enclosure 500.

Figure 6:
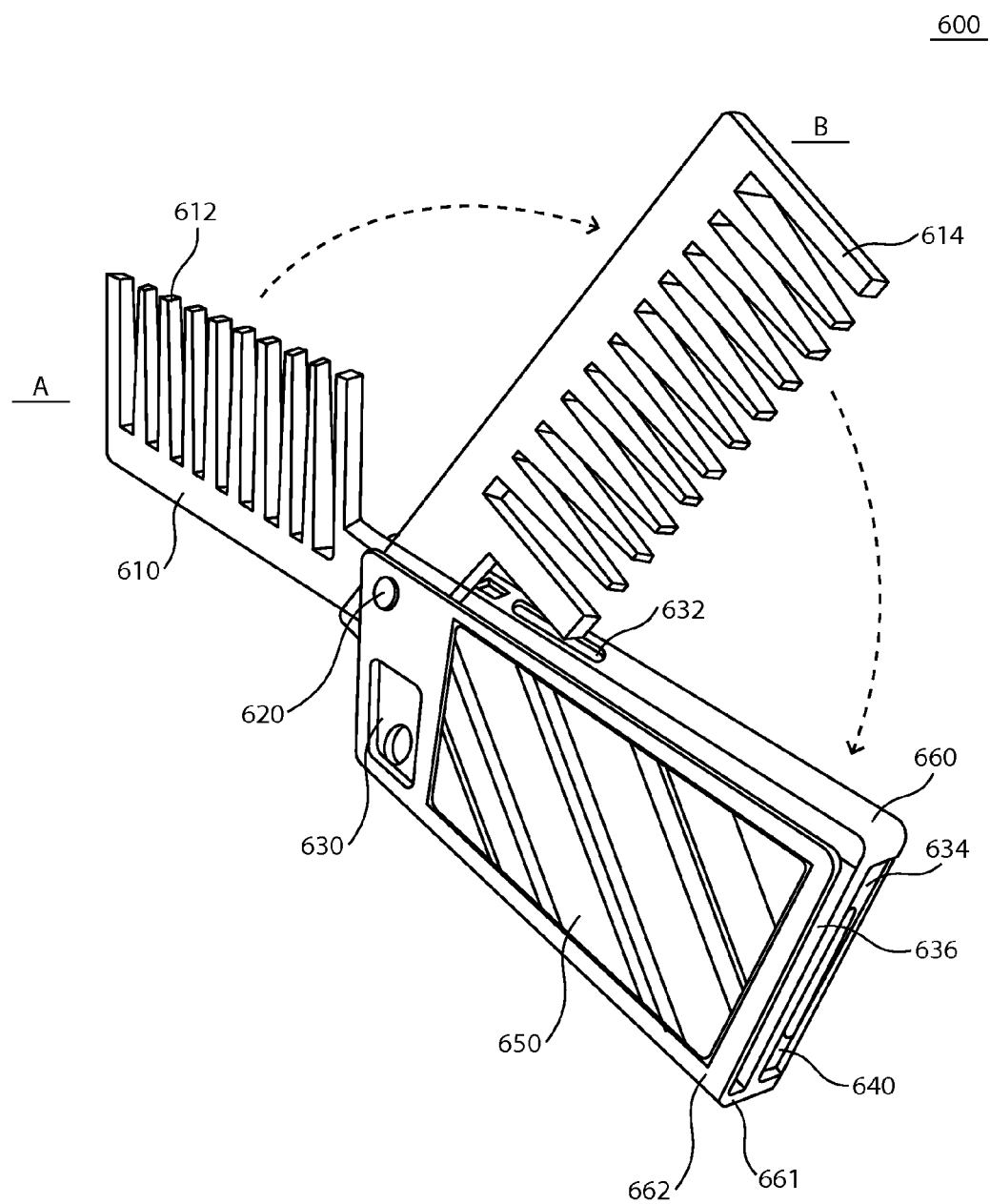
FIG. 6 illustrates an aspect of an exemplary embodiment of the present invention.

In an embodiment of the present invention a hair management device may be physically attached to a protective enclosure. As illustrated in FIG. 6 for example, protective enclosure 600 may have attached thereto a hair management device such as for example, comb 610. Comb 610 may include teeth 612 which may be appropriately spaced to provide the desired combing affect through a user's hair and have a length not greater than the width of protective enclosure 600. Comb 610 may further comprise at least one end tooth 614 which may be of a different size or dimension to compliment the enclosure of comb 610 within protective enclosure 600.

Furthermore, comb 610 may be fixed to protective enclosures 600 by a fastening means 620 which may be located approximate to at least one corner of protective enclosure 600 fastener means 620 may consist of a peg pin rivet and/or other fastening device known to those skilled in the art to allow for comb 610 to pivot about at least one access near one end of comb 610. In this way, comb 610 may be move from position A as illustrated in FIG. 6 to position B and ultimately substantially within the gap provided by protective enclosure 600. The space provided by protective enclosure 600 may be formed between inner back portion 636 and outer back portion 662 which may be partially connected to inner back portion 636 by left side portion 661. Support for outer portion 662 may be provided by left side portion 661 and by fastener means 620 for example. Outer back portion 662 may further comprise a mirror portion 650 and a camera opening 630 which may allow for the camera of substantially enclosed mobile device 634 to be unimpeded by protective enclosure 600. Mobile device 634 may be enclosed by inner back portion 636 and at least right side portion 660 and left side portion 661.

Each of the enclosing features of protective enclosure 600 may include at least some portion which may help hold mobile device 634 into place as would be appreciated by those skilled in the art and as otherwise discussed herein. Right side portion 660 may further include at least one control opening 632 while the bottom portion of protective enclosure 600 may also include a lower opening 640 to allow for access to the lower portion of mobile device 634. As would be appreciated by those skilled in the art, the protective enclosure 600 may be of any material such as plastic and/or metal and may be made of varying materials. For example, the comb 610 may be made of metal while a substantial portion of protective enclosure 600 may be a thermal plastic. Similarly, mirror 650 may be of a film and/or glass and/or other materials known to have reflective qualities as would be known to those skilled in the art.

Those of skill in the art will appreciate that the herein described systems and methods may be subject to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

What is claimed is:

1. An electronic device having interactive controls and having a protective enclosure wherein the protective enclosure comprises:

a protective shell substantially surrounding said electronic device when said electronic device is disposed in said shell, said electronic device being insertable in and removable from said shell by hand;

at least one opening in said shell substantially aligned with said interactive controls when said electronic device is disposed in said protective shell; and at least one appearance enhancement device substantially removably disposed within the bounds of said shell, wherein the at least one appearance enhancement device is a comb, wherein the comb comprises teeth;

said teeth having a height ratio equal to 0.25 to 0.5 the total height of the protective enclosure.

2. The protective enclosure of claim 1, further comprising at least one secure attachment item to at least the at least one appearance enhancement device.

3. The protective enclosure of claim 2, wherein the at least one secure attachment item is selected from the group comprising a pin and a clip.

4. The protective enclosure of claim 1, wherein the at least one appearance enhancement device is substantially covered by said enclosure.

5. The protective enclosure of claim 4, wherein at least a portion of said electronic device is exposed after removal of the at least one appearance enhancement device.

6. The protective enclosure of claim 4, wherein the at least one appearance enhancement device comprises a plurality of bristles.

7. The protective enclosure of claim 4, wherein the at least one appearance enhancement device is substantially covered by said enclosure.

8. The protective enclosure of claim 4, wherein the at least one appearance enhancement device is exposed by removing at least a portion of said enclosure.

9. An electronic device having interactive controls and having a protective enclosure wherein the protective enclosure comprises:

a protective shell substantially surrounding said electronic device when said electronic device is disposed in said shell, said electronic device being insertable in and removable from said shell by hand;

at least one opening in said shell substantially aligned with said interactive controls when said electronic device is disposed in said protective shell; and at least one appearance enhancement device substantially integral to said shell;

wherein the at least one appearance enhancement device is a comb, wherein the comb comprises teeth;

said teeth having a height ratio equal to 0.25 to 0.5 the total height of the protective enclosure.

\* \* \* \* \*